Dec. 5, 1967 P. G. KAPPUS 3,355,890
CRUISE FAN POWERPLANT
Filed June 9, 1965
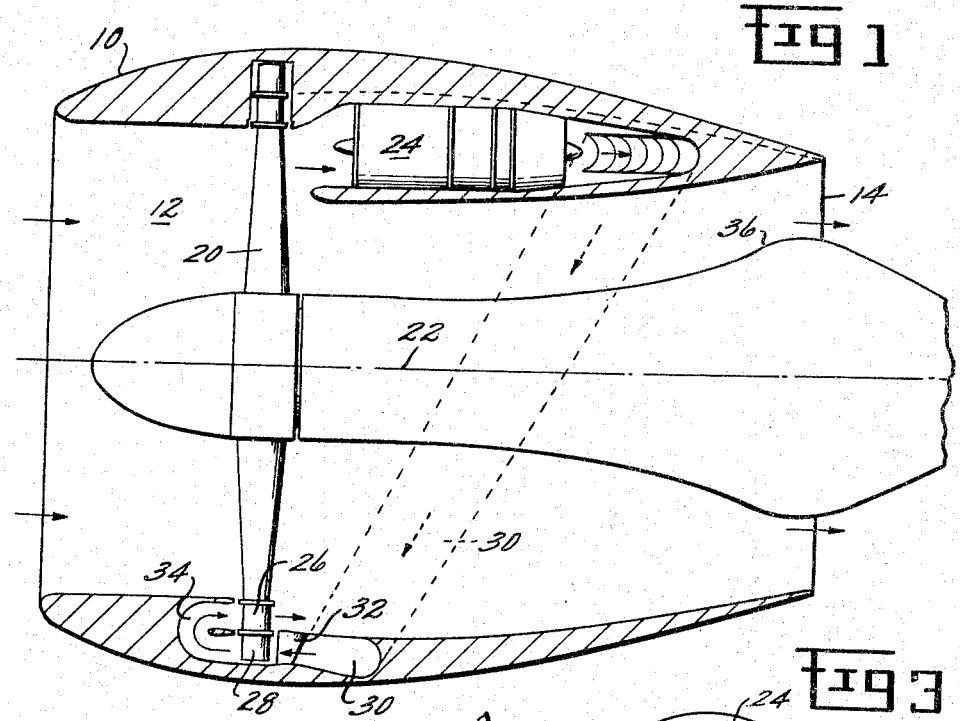
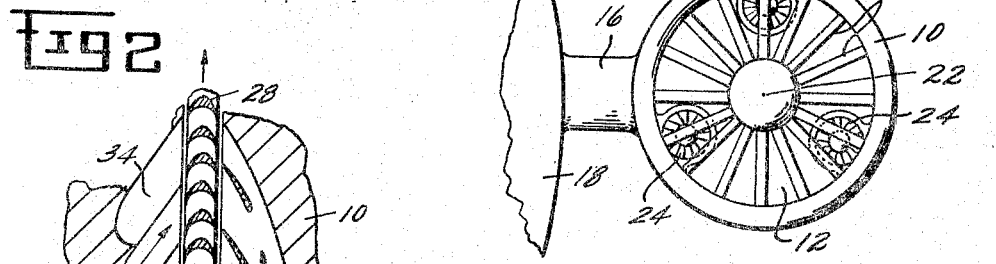
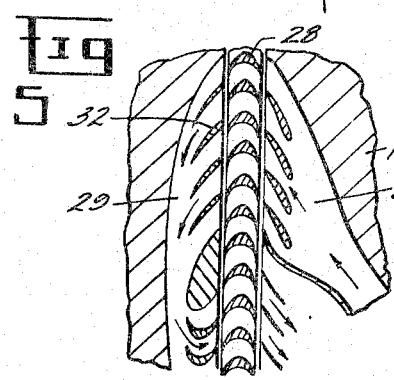
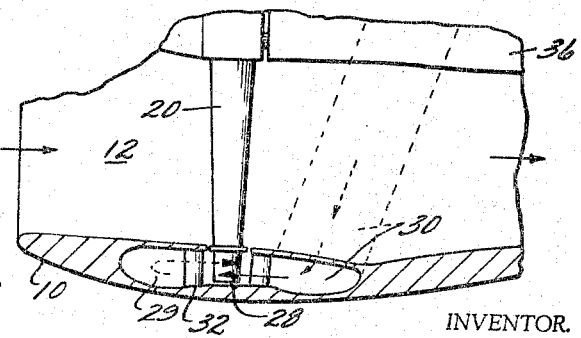
INVENTOR.
PETER G. KAPPUS
BY John F. Cullen
ATTORNEY United States Patent Office 3,355,890
Patented Dec. 5, 1967

3,355,890
CRUISE FAN POWERPLANT
Peter Gottfried Kappus, Cincinnati, Ohio, assignor to General Electric Company, a corporation of New York
Filed June 9, 1965, Ser. No. 462,694
5 Claims. (Cl. 60—262)

ABSTRACT OF THE DISCLOSURE

This invention is directed to a tip turbine high bypass ratio cruise fan powerplant where the gas generator is eccentrically mounted downstream of and in the fan flow and is thereby supercharged by the fan. The gas generator exhaust is then directed in a reverse flow manner through the tip turbine. This arrangement keeps the frontal area of the powerplant at a minimum.

---

It has long been known that fan type powerplants are desirable to obtain high propulsive efficiency at subsonic cruise speeds. A typical fan powerplant may consist of a conventional jet engine which may operate a freely rotating front or aft fan concentric with the jet engine with the fluid flow passing through the jet engine. Typically, such a concentric turbofan type engine may be built with bypass ratios of 2 to 1 or a little higher using conventional fan turbines. For higher ratios—up to 8 to 1—twin spool turbofan engines have been developed which consist of an inner jet engine type gas generator which operates in the normal fashion. It is supercharged by a large front fan that is in turn driven by a multi-stage or geared turbine downstream of the jet engine turbine and having an interconnecting shaft generally passing through the center of the jet engine—thus the name twin or dual spool turbofan.

The difficulty with the above arrangements is that at high bypass ratios geared turbines are needed to match turbine and fan tip speeds. This leads to a large increase in weight. A mismatch develops between the fan and the turbine that drives the fan if no reduction gear is used. In other words, for high bypass ratios powerplants, the tip speed of the fan becomes very high whereas the turbine downstream of the jet engine which turbine drives the fan is relatively small and has a much lower tip speed. Consequently, it becomes necessary to add more stages to the turbine to extract the energy that is developed by the supercharged gas generator in order that the turbine may drive the fan.

Another way to build a high bypass ratio turbofan is the cruise fan. This is a powerplant that can go to bypass ratios of 12 to 1 or higher. It has the advantage of no matching problems since it applies a tip turbine which is mounted directly on the periphery of the fan with a well matched tip speed. Thus, this type of powerplant avoids the mismatching problem as well as the additional turbine stages required in low tip speed turbines. By using a tip turbine fan it is possible to avoid reduction gears as well as multi-stage turbines. This is done by making the gas generator discharge directly on the tip turbine to enable one turbine stage to do the work that previously required numerous stages or a higher turbine speed in order to extract sufficient energy to drive the large fan in the turbofan type of powerplant. However the conventional cruise fan configuration requires a large envelope and does not allow the fan to supercharge the gas generator since it is generally mounted ahead of the fan.

The main object of the present invention is to provide a tip turbine high bypass ratio cruise fan which takes advantage of the supercharging capabilities of the fan as in a turbofan but maintains all the advantages of a cruise fan.

Another object is to provide such a cruise fan powerplant which permits the use of existing jet engines for gas generators and maintains an undisturbed substantially round powerplant with no protrusions.

A further object is to provide such a powerplant which may use a reverse flow turbine without presenting any difficult sealing problems.

A further object is to provide such a powerplant wherein the gas generator means is disposed eccentrically to the cruise fan within the fan stream to maintain the outer nacelle structure with a minimum frontal area.

Briefly stated, the invention is directed to a tip turbine high bypass ratio cruise fan powerplant which has a nacelle with a duct extending therethrough and a fan mounted in the nacelle duct to move a large volume of low velocity air for thrust. Gas generator means is disposed within the nacelle and in the duct downstream of the fan and eccentric thereto to be supercharged by the fan. The fan is preferably a tip turbine fan and conduit means is supplied to direct the gas generator exhaust through the tip turbine and into the direction of the fan flow. Preferably, the tip turbine may include dual stacked stages on the end of the fan blades and the conduit means also provides for reverse flow through the outer stage and rearward through the inner stage into the fan flow. Additionally, the turbine stages may be impulse stages to avoid sealing problems between the stages. The nacelle is equipped with a nozzle for thrust and the gas generator means may consist of single or plural jet engines disposed within the nacelle and around the inner periphery of the duct.

While the specification concludes with claims particularly pointing out and distinctly claiming the subject matter which is regarded as the invention, it is believed the invention will be better understood from the following description taken in connection with the accompanying drawings, in which:

FIGURE 1 is a cross-sectional view of a cruise fan powerplant of the instant invention;

FIGURE 2 is a partial developed view of the turbine structure;

FIGURE 3 is a schematic front view of the cruise fan as it might be attached to an aircraft member;

FIGURE 4 is a partial view of a single stage modification; and

FIGURE 5 is a partial developed view of the FIGURE 4 modification.

Referring first to FIGURE 1, there is shown a typical cruise fan tip turbine powerplant of the high bypass ratio type. It comprises a preferably circular nacelle 10 with a duct 12 extending therethrough and formed with a nozzle 14 at the aft end thereof for thrust purposes as will be explained. Obviously nozzle 14 may preferably be fixed as shown or may have area varying means such as an expanding plug or flaps well known in the art. Reference to FIGURE 3 shows a schematic front view of the cruise fan as it may be supported by a pylon 16 from an aircraft member 18 that may be a fuselage or wing or suitable supporting structure.

In order to move large quantities of air for thrust, there is provided a cruise fan 20 that is mounted for rotation about a central axis 22 in the conventional manner. The fan is designed to move a large volume of low velocity air through the nacelle duct and to expel it through nozzle 14 for thrust. In conventional powerplants of the type thus far described, it has been customary to provide gas generator means on the outer surface of the nacelle 10 and to duct the gas pneumatically, in the case of tip turbine fans, into a scroll and thereby drive fan 20. This has the advantage of the gas generator receiving undisturbed ram air pressure but in comparison to a concentric front fan requires additional compressor stages on the gas generator in order to develop the turbine power necessary to drive the large fan and result in a larger than desired powerplant envelope. Standard supercharging, per se, is well known and is used in many turbofan arrangements including the dual or twin spool type mentioned above. The disadvantage of the twin spool powerplants is their inability to operate satisfactorily at high bypass ratios. Mismatching, as stated above, occurs and either reduction gears or multiple turbine stages are required making the powerplant heavy and complex thus the cruise fan powerplant. In order to take advantage of the supercharging capabilities of the fan, and at the same time maintain the rather large nacelle structure within bounds and keep the frontal area to a minimum, the present invention proposes to remove the gas generator from the outer side of the nacelle and place a smaller gas generator 24 eccentrically inside of the duct and downstream of the fan. It will be apparent that the gas generator may be supercharged by placing it concentrically about axis 22 as has been done but this creates the problem of ducting the exhaust gases to the turbine buckets through the fan duct when a tip turbine fan is used. Consequently, the invention places the gas generator eccentrically as shown in FIGURE 1 adjacent the inner periphery of the duct 12.

As previously noted, the use of tip turbine fans is known and it is such a fan that is used herein. To that end, cruise fan 20 has mounted at the ends or periphery thereof tip turbine buckets 26 to drive the fan. Because of placement of the gas generator downstream of the fan for supercharging it becomes necessary to direct the exhaust gases through the tip turbine buckets 26 so that they exhaust into the direction of the fan flow. Dual stages of turbine buckets of appropriate size more efficiently extract high pressure energy than a single stage. The present arrangement lends itself well to this. Thus, it is convenient and advantageous with this arrangement to use stacked or dual stages by providing an additional turbine bucket stage 28 on the outer periphery of tip turbine 26. Thus, two rows of radially spaced or stacked turbine buckets are mounted at the ends of the fan. When this construction is used it becomes a reverse flow turbine which is an efficient means of extracting the energy from the exhaust gases. In other words, the two stage turbine described is beneficial when the pressure level of the gas generator is relatively high as is the case in gas generator 24 because the two stages use the high pressure gas more efficiently than a single stage turbine. Inasmuch as gas generator 24 is supercharged by reason of its location within the duct it may thereby dispense with some of the stages on its own compressor with the result of an overall pressure level high enough to use the two turbine stages efficiently. With the high pressure gases involved and the desirability of the stacked stages, the arrangement lends itself to the use of impulse stages, which, having no pressure drop across the stages minimizes the sealing problems between stages. Of course, the use of two stages presents the problem of exhausting the gases into the direction of flow.

To this end, there is provided a scroll 30 which may extend around and within the walls of the nacelle 10 and is connected to direct the exhaust gases properly by means of nozzles 32 and conduit 34. The tip turbine buckets 26 may have the gases directed therethrough by forming conduit 34 into nozzles upstream of the buckets 26. Consequently, the scroll 30 collects the exhaust gases within the nacelle and directs them forwardly through the outer buckets 28 and then the reversing conduit 34 directs them rearwardly through the inner buckets 26 and into the fan flow.

The frontal area is maintained at a minimum and the outer powerplant envelope is maintained round as shown in FIGURE 3. It is possible to obtain this advantage because sizing of the cruise fan normally requires the inner part of the duct to have a plug member at 36 in order to form a preferably converging nozzle. By disposing the gas generators within the duct it is possible to take up some of the excess room and obtain the advantages of supercharging, the efficiency of the two-stage reverse flow turbine as well as the advantage of the outer envelope being free of any protrusions while maintaining the overall advantages of the high bypass ratio inherently lightweight tip turbine fan.

Obviously, depending on the particular powerplant characteristics desired, plural gas generators 24 may be employed as shown in FIGURE 3 and these will all be connected to the scroll 30. All of the gas generator means will be disposed adjacent the inner periphery of the duct to maintain the outer undisturbed envelope and the benefits of the supercharging.

A modification, as shown in FIGURES 4 and 5, may use a single stage reverse flow turbine with alternating direction of gas flow.

The gas from the gas generators is ducted by conduit 29 to a number of individual nozzle scrolls 30 which together occupy a little less than one half of the tip turbine circumference for partial admission. After passing through the tip turbine buckets 28 in a forward direction, and having transmitted part of its usable energy to the tip turbine, the gas flow direction is reversed in conduits 29 and passes the tip turbine buckets 28 in a rearward direction emerging on the downstream side and mixing with the fan mass flow. Its remaining kinetic energy together with that of the fan air mass flow produces useful thrust.

Both versions of a reverse flow turbine (dual stacked stages as in FIGURE 1 or partial admission as in FIGURES 4 and 5) may be used. The system illustrated in FIGURE 1 has the advantage of better adjustment of the flow passages in both directions.

It will be apparent that the advantages of the high bypass ratio cruise fan are maintained by moving the gas generator 24 from outside the nacelle 10 while at the same time by the combination just described, additional advantages are achieved. These are the advantages of supercharging, fewer compressor stages in the gas generator 24 because of the supercharging, the efficient arrangement of the two-stage turbine that may be used because of the downstream location of the gas generator and finally the complete unobstructed outer nacelle which is permitted by locating the gas generators within the nacelle duct utilizing the available large volume behind the fan.

While there have been described preferred forms of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. A fan assembly for producing propulsive thrust, said fan assembly comprising:
  a generally annular nacelle having a streamline outer surface,
  air duct means extending through said nacelle for forming an inlet and outlet for air,
  a fan rotatably mounted in said duct means to pressurize air from said inlet for discharge through said outlet,
  a plurality of turbine blade means mounted on the periphery of said fan,
  at least one gas turbine engine mounted in said nacelle downstream of and radially outward from the axis of said fan, and adjacent the outer periphery of said nacelle, said gas turbine engine having an air inlet for receiving pressurized air from said fan and generating a hot gas stream,
  duct means extending from said gas turbine to said turbine blade means for causing said hot gas stream to impinge on said turbine blade means and drive said fan, said duct means extending generally circumferentially from said gas turbine engine so that the air inlet for said engine and the outlet end of said duct are substantially peripherally spaced from one another, whereby the aerodynamic resistance of said fan assembly is minimized and said gas turbine engine is supercharged.

2. A fan assembly as in claim 1 wherein:
said gas turbine engine is mounted between the outer periphery of said nacelle and said air duct means.

3. A fan assembly as in claim 1 wherein:
said turbine blade means comprise two rows of radially spaced stacked turbine blades,
said duct means includes scroll means for directing said hot gas stream in a forward direction through one row of turbine blades and a rearward direction through the other row of said blades into the air stream through said nacelle.

4. A fan assembly as in claim 3 wherein:
said turbine blades are impulse stages.

5. A fan assembly as in claim 2 wherein:
said nacelle has a plurality of said gas turbine engines mounted therein,
each of said gas turbine engines is connected to said duct.

References Cited

UNITED STATES PATENTS

| | | |
|---|---|---|
| 1,929,778 | 10/1933 | Goddard. |
| 2,168,726 | 8/1939 | Whittle _____ 60—262 |
| 2,505,660 | 4/1950 | Baumann _____ 60—226 |
| 2,801,789 | 8/1957 | Moss _____ 230—116 |
| 3,033,492 | 5/1962 | Rowe _____ 244—23 |
| 3,035,792 | 5/1962 | Klapproth _____ 244—23 |
| 3,212,731 | 10/1965 | Kappus _____ 244—12 |

MARK M. NEWMAN, *Primary Examiner.*

D. HART, *Assistant Examiner.*